(12) United States Patent
Haskins

(10) Patent No.: US 7,093,072 B2
(45) Date of Patent: Aug. 15, 2006

(54) METHODS FOR IMPROVED DATA CACHING

(75) Inventor: Gregory Haskins, Worcester, MA (US)

(73) Assignee: Enterasys Networks, Inc., Andover, MA (US)

( * ) Notice: Subject to any disclaimer, the term of this patent is extended or adjusted under 35 U.S.C. 154(b) by 202 days.

(21) Appl. No.: 10/371,969

(22) Filed: Feb. 21, 2003

(65) Prior Publication Data

US 2004/0168031 A1    Aug. 26, 2004

(51) Int. Cl.
G06F 12/00 (2006.01)
(52) U.S. Cl. .................. 711/118; 711/133; 711/135; 711/136; 711/159; 711/160
(58) Field of Classification Search ................ 711/118, 711/133, 135, 136, 144, 159, 160
See application file for complete search history.

(56) References Cited

U.S. PATENT DOCUMENTS 5,778,430 A    7/1998  Ish et al.
5,895,485 A    4/1999  Loechel et al.
6,041,396 A    3/2000  Widigen et al.
6,574,709 B1 *  6/2003  Skazinski et al. ............ 711/119
6,633,299 B1 * 10/2003  Sreenivas et al. ............ 345/557
6,732,234 B1 *  5/2004  Rowlands et al. ........... 711/117
6,748,492 B1 *  6/2004  Rowlands et al. ........... 711/128
6,782,452 B1 *  8/2004  Williams, III ............... 711/133

FOREIGN PATENT DOCUMENTS

EP    1 074 916 A    2/2002

* cited by examiner

*Primary Examiner*—Mano Padmanabhan
*Assistant Examiner*—Jasmine Song
(74) *Attorney, Agent, or Firm*—Lowrie, Lando & Anastasi, LLP (57) ABSTRACT

Write transactions with large amounts of data using a typical cache may consume over half of the available backing store bandwidth because of the way traditional caching algorithms fill lines during a write-invoked eviction. Relaxing the traditional constraint of cache coherency improves write performance by eliminating unneeded cache line fills. This technique conserves backing store bandwidth during many write operations while having negligible impact on the cache's read performance.

28 Claims, 7 Drawing Sheets

Step 1: A valid but not coherent line is presented

Step 2: Fulfillment writes to offset (5:7)

Step 3: Write request: 2 blocks at 10020 faults with a lazy miss

Step 4: Lazy fill using the spare line

FIG. 6A

Step 5: Copy out dirty data from the old line to the spare

Step 6: Swap out the buffers, and update the descriptor to COHERENT

Step 7: Perform the write at offset(20:21), and adjust the dirty-span

FIG. 6B

METHODS FOR IMPROVED DATA CACHING

FIELD OF THE INVENTION

The invention relates to data caching, and, in particular, to caching methods having improved write performance.

BACKGROUND OF THE INVENTION

Computers utilize processors to access and manipulate stored data. The limiting factor on an application's performance is typically the rate at which the processor can be provided with data. This rate is referred to as the "bandwidth" between the processor and the backing store (i.e., the memory) containing the data. A backing store fashioned from a persistent storage device, such as a hard disk, can cheaply store large quantities of data. However, the bandwidth between the processor and the persistent memory may be significantly less than the rate at which the processor can actually process the data. The processor idles while it waits to receive data for processing, hindering the application's performance.

One solution to this problem uses high-bandwidth memories having significantly higher bandwidth to store data that is frequently accessed by the processor. This technique is referred to as caching. Using a high-bandwidth memory as a cache reduces the amount of time that a processor waits to receive data for processing, improving the processor's performance.

The difference in bandwidth between persistent and volatile memories is generally due to their different underlying technologies. An exemplary persistent storage device uses Winchester-style magnetic platters, while an exemplary high-speed memory uses static random-access memory (SRAM). The difference in underlying technology and resulting difference in bandwidth typically make volatile memories more expensive and smaller in capacity than persistent memories. As a result, a cache memory using volatile memory will be smaller in size than an associated backing store; otherwise, the backing store would be implemented using the cache memory technology.

The difference in capacity between the backing store and the cache memory requires that the data passing between the processor and the backing store be selectively cached in any cache memory. This requirement of selectivity has led to development of caching algorithms, i.e., methods for determining which data is to be stored in the cache. Some cache algorithms focus on improving the performance of processor reads from slower backing store memory subsystems. However, certain applications, such as saving the state of a routing table in a network router device, would benefit from improved performance in a processor's ability to write data to a backing store.

A need therefore exists for caching methods that enhance the write performance between a processor and a backing store.

SUMMARY OF THE INVENTION

The present invention relates to methods for caching with improved write performance. Write transactions with large amounts of data using a typical cache may consume over half of the available memory bandwidth because of the way traditional caching algorithms fill lines during a write-invoked eviction. By eliminating unneeded cache line fills, memory bandwidth may be conserved with negligible impact on the cache's read performance. Relaxing the traditional constraint of cache coherency also improves write performance.

In one aspect, the present invention provides a method for servicing requests to a memory using a cache having at least one structure, such as a line, associated with an address in the memory. A request to write to at least one address in the memory is received. The cache is examined to determine whether it contains a data structure associated with the address in the write request. If the cache does not contain an associated structure, then a structure in the cache is filled with data from the region in memory containing the address of the write request. The write request is then serviced using the filled structure. A value is stored that is indicative of the contiguous subregion of the structure affected by the servicing of the writing request. The value may be stored in a descriptor that includes a pointer to the cache structure and a field for storing the value.

In one embodiment, the structure selected for filling is the least recently used structure in the cache. The examination of the cache may include the computation of an index value from the addresses in the request and the examination of an entry in a lookup table associated with the computed index value. The contents of the structure used to service the request, or a subset of those contents, may be flushed to memory before it is filled with data related to the request.

In one embodiment, the storage of the value indicative of the subregion affected by the service of the request involves accessing a previously stored subregion value, computing a new subregion value specifying a contiguous range from the sum of the previous value and the value of subregion affected by the request, and storing the new subregion value. The method may also include the step of writing the contents of the contiguous subregion of the structure to a memory. The size of the structures in the cache may be adjusted to improve write performance.

In another aspect, the present invention provides a method for servicing requests to a memory using a cache having at least one structure, such as a line, associated with an address in the memory. A request to write to at least one address in the memory is received. The cache is examined to determine whether it contains a data structure associated with the address in the write request. If the cache does not contain an associated structure, then a structure in the cache is evicted and used to service the request. A value is stored that is indicative of the contiguous subregion of the structure affected by the servicing of the writing request. The value may be stored in a descriptor including a pointer to the cache structure and a field for storing the value. The method may also include the step of writing the contents of the contiguous subregion of the structure to a memory. The size of the structures in the cache may be adjusted to improve write performance.

In one embodiment, the method further includes servicing a second request to read from at least one address in the memory, the address associated with the aforementioned structure, wherein the address of the second request is contained in the addresses associated with the contiguous subregion of the structure. In another embodiment, the method further includes receiving a second request to read from at least one address in the memory, the address associated with the aforementioned structure, wherein the address of the second request is not contained in the addresses associated with the contiguous subregion of the structure. In this embodiment, data is added to a second structure in the cache from a region in the memory including the address of the second request and the data from the contiguous subregion of the first structure is copied to the second structure. The second request may be serviced using the second structure. The second structure may be used to replace the first structure and the stored subregion value may be modified to reflect the contiguous range specified by the sum of the previously-stored subregion value with a value specifying the subregion affected by the servicing of the second request.

In still another embodiment, a second request to write to at least one address in the memory is received. The address of the second request is associated with the first structure, but it is not contained in the addresses associated with the contiguous subregion of the first structure. Data is added to a second structure in the cache from addresses in the memory that include the addresses in the second request. The data from the contiguous subregion of the first structure is copied to the second structure. The second request may be serviced using the second structure, and the first structure may be replaced by the second structure. Additionally, the stored subregion value may be modified to specify the contiguous range reflecting the sum of the previously-stored subregion value with the subregion affected by the servicing of the second request.

In one embodiment, the structure selected for eviction is the least recently used structure in the cache. The examination of the cache may include the computation of an index value from the addresses in the request and the examination of an entry in a lookup table associated with the computed index value. The contents of the structure used to service the request, or a subset of those contents, may be flushed to a backing store before the structure is invalidated.

The foregoing and other features and advantages of the present invention will be made more apparent from the description, drawings, and claims that follow.

BRIEF DESCRIPTION OF THE DRAWINGS

The advantages of the invention may be better understood by referring to the following description taken in conjunction with the accompanying drawings in which.

In the drawings, like reference characters generally refer to corresponding parts throughout the different views. The drawings are not necessarily to scale, emphasis instead being placed on the principles and concepts of the invention.

DETAILED DESCRIPTION OF THE INVENTION

The present invention relates to methods for caching with improved write performance. In general, tracking the subregions of cache structures dirtied by cache write operations reduces the bandwidth required to flush cache structures. Relaxing cache coherency constraints also improves write performance by eliminating unneeded cache line fills.

The following discussion presents several examples for illustrative purposes. It is to be understood that these embodiments are used to illustrate the operation of the claimed invention. These embodiments and the numerical parameters associated therewith are not intended to limit the scope of the invention, which is determined by the claims.

Throughout the specification, the following definitions will apply:

A "flush" operation writes dirtied data from a line structure $100_N$ in the cache to the backing store.

An "invalidate" operation makes a cache line structure $100^N$ invalid. That is, the "VALID" state flag in the associated descriptor structure $104^M$ is unset, references to the line structure $100^N$ are removed from the lookup table 108, and other data structures normally associated with a valid line are removed.

An "evict" operation removes a line structure $100^N$ from the cache system. If the line is not "DIRTY", an "evicted" line structure $100^N$ is invalidated; if the line is "DIRTY", the "evicted" line structure $100^N$ is flushed and invalidated.

An "eviction policy" determines which line structure $100_N$ is evicted from the cache when a cache miss occurs and a line structure $100^N$ needs to be reused. One eviction policy is "LRU", evicting the least-recently used line structure $100^N$.

Figure 1:
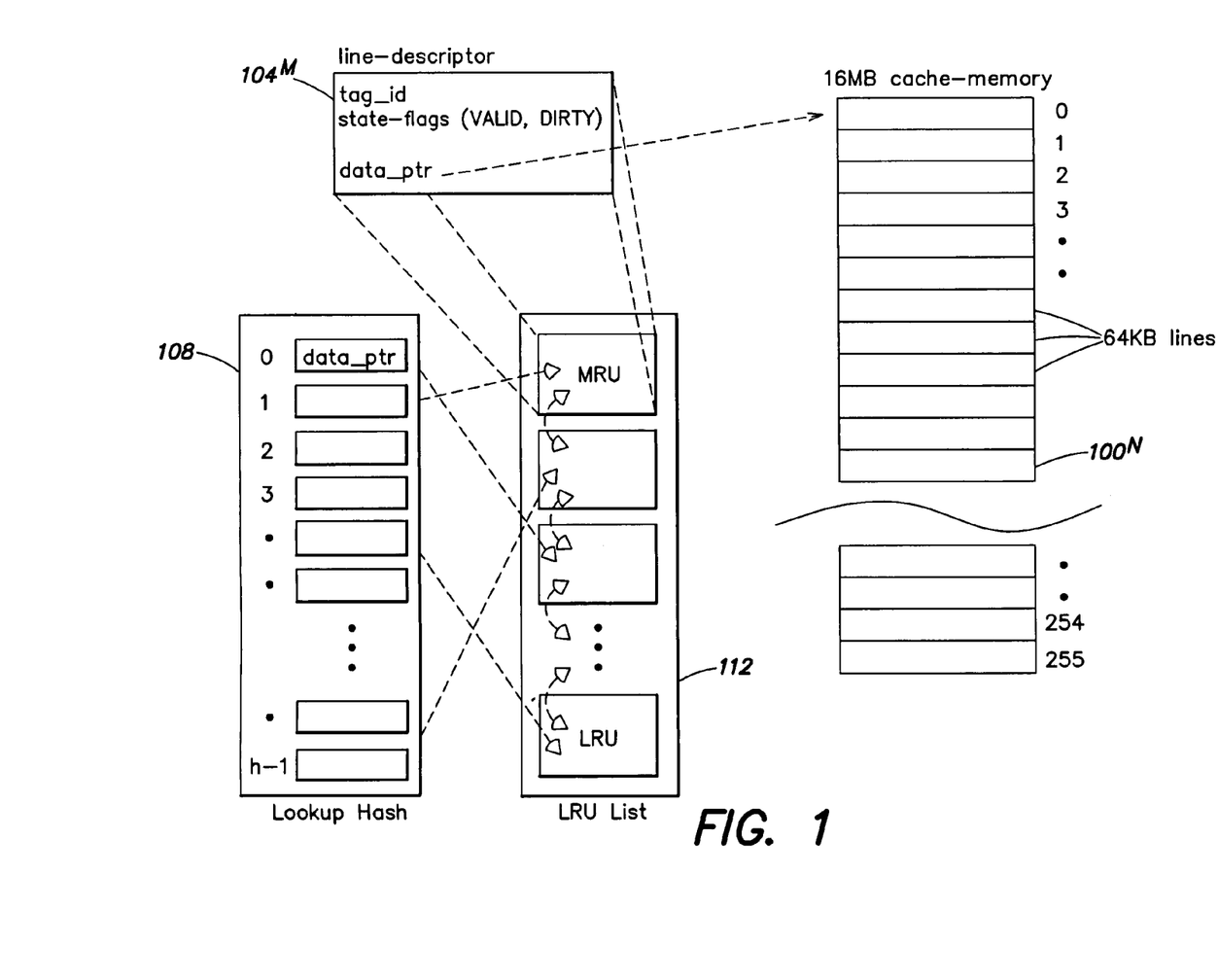
FIG. 1 depicts a cache structure suited for use with the present invention.

FIG. 1 presents a typical caching structure in which the methods of the present invention may advantageously be implemented. This cache may be used to, e.g., buffer transactions between a processor and a backing store using a hard disk or disk array. As illustrated, the cache includes a plurality of N line structures $100^N$, a plurality of M descriptor structures $104^M$ (where M may or may not equal N), and a lookup table 108. These data structures may be stored in the same memory or in different memories.

In the example of FIG. 1, the memory containing the line structures $100^N$ is 16 megabytes in size. The memory is divided into 256 line structures $100^N$ of 64 kilobytes (i.e., 1,024 bytes) each. These parameters are configurable and the same region of memory could just as easily be divided into 512 line structures $100^N$ of 32 kilobytes each. These parameters may be altered to improve performance, as discussed in greater detail below.

Each line structure $100^N$ is associated with a descriptor structure $104^M$. The descriptor structure $104^M$ includes several parameters that describe the state of the line. A tag identifier ("tag_id") may be used to specify a base memory value for the associated line structure $100^N$, so that the other memory locations in the line structure $100^N$ may be identified as an offset value relative to this base value. For example, if the tag identifier specifies a base address of 10000 for a particular line structure 100, then the cache location for addresses 10005 through 10007 can be found at offsets 5 through 7 of the line structure 100. The descriptor structure $104^M$ includes several flags ("state-flags") that indicate whether the associated line structure $100^N$ satisfies particular conditions of interest. For example, if a line structure is "DIRTY" (as discussed below) then the associated state flag for "DIRTY" may be set to convey this information to the cache engine or fulfillment engine. The descriptor structure $104^M$ also contains a pointer ("data_ptr") to the associated line structure $100^N$, permitting the descriptor structures $104^M$ to be stored in a memory that is separate from that containing the line structures $100^N$.

In one embodiment where this caching system is used to handle file system data requests, each line structure $100^N$ contains data from the appropriate number of associated disk blocks. For example, when a line structure $100^N$ is 64 kilobytes long, the structure $100^N$ contains data from 128 512-byte sectors from the backing store. The aforementioned tag identifier specifies the address of the first block contained in the line structure $100^N$. The other sectors contained in the line structure $100^N$ are accessed using an offset value relative to the base value specified by the identifier. For example, any individual sector stored in a line structure $100^N$ storing the data of 128 sectors from the backing store may be accessed using an offset number ranging from 0 to 127.

The state flags in the descriptor structure $104^M$ may be implemented as Boolean values specifying that the associated line structure $100^N$ satisfies one or more conditions of interest. The state flags may be alternately implemented as one or more enumerated values, with each enumerated value specifying a single parameter or a combination thereof. To facilitate discussion, the state flag implementation is assumed to use Boolean values and the flags in the descriptor structure $104^M$ are referred to as being "set" or "unset." When the line structure $100^N$ satisfies a condition of interest and the associated flag is set, the line structure $100^N$ may be said to be in the state corresponding to the flag.

In the embodiment of FIG. 1, there are two specified state flags in the descriptor structure $104^M$: "VALID" and "DIRTY." Accordingly, the "VALID" and "DIRTY" flags may be set for a particular line structure $100^N$ and the line structure $100^N$ may be said to be "VALID" or "DIRTY." The "VALID" state flag is set when a line structure $100^N$ is filled with data from the appropriate addresses in the backing store memory. The "VALID" state flag is cleared when the contents of the line structure $100^N$ are emptied, i.e., "invalidated." Similarly, the "DIRTY" state flag is set when a line structure $100^N$ is filled with data from a write transaction. The "DIRTY" state flag is cleared when the contents of a "DIRTY" line structure $100^N$ are written, i.e., "flushed," to the backing store memory.

The descriptor structures $104^M$ are stored in a data structures such as a doubly-linked list—referred to hereinafter as the "descriptor pool" 112—to facilitate the implementation of caching strategies without requiring the manipulation or resorting of the underlying line structures $100^N$. For example, the implementation of a least-recently used (LRU) cache policy would require three pointer operations to resort a doubly-linked list of descriptor structures $104^M$ to move the descriptor structure $104^M$ associated with the most-recently accessed line structure $100^N$ to the head of the list. Implementing the policy directly on the line structures $100^N$ would require three line structure-sized copy operations and the availability of additional storage to cache the data from a line structure $100^N$.

At initialization, the "VALID" state flags in the descriptor structures $104^M$ for the associated line structures $100^N$ are unset to indicate that the data in the line structures $100^N$ is "invalid." When a line structure $100^N$ becomes "VALID"—filled with data from the appropriate addresses in the backing store memory—it is indexed in a lookup table 108 to facilitate the identification of cached memory locations. The line structure $100^N$ is removed from the lookup table 108 when it becomes invalid, i.e., its "VALID" state flag is unset. The lookup table 108 may be implemented using a data structure such as a hash table. Regardless of their presence in the lookup table 108, the descriptor structures $104^M$ associated with the underlying line structures $100^N$ remain stored and accessible in their own data structure, as discussed above.

Figure 2:
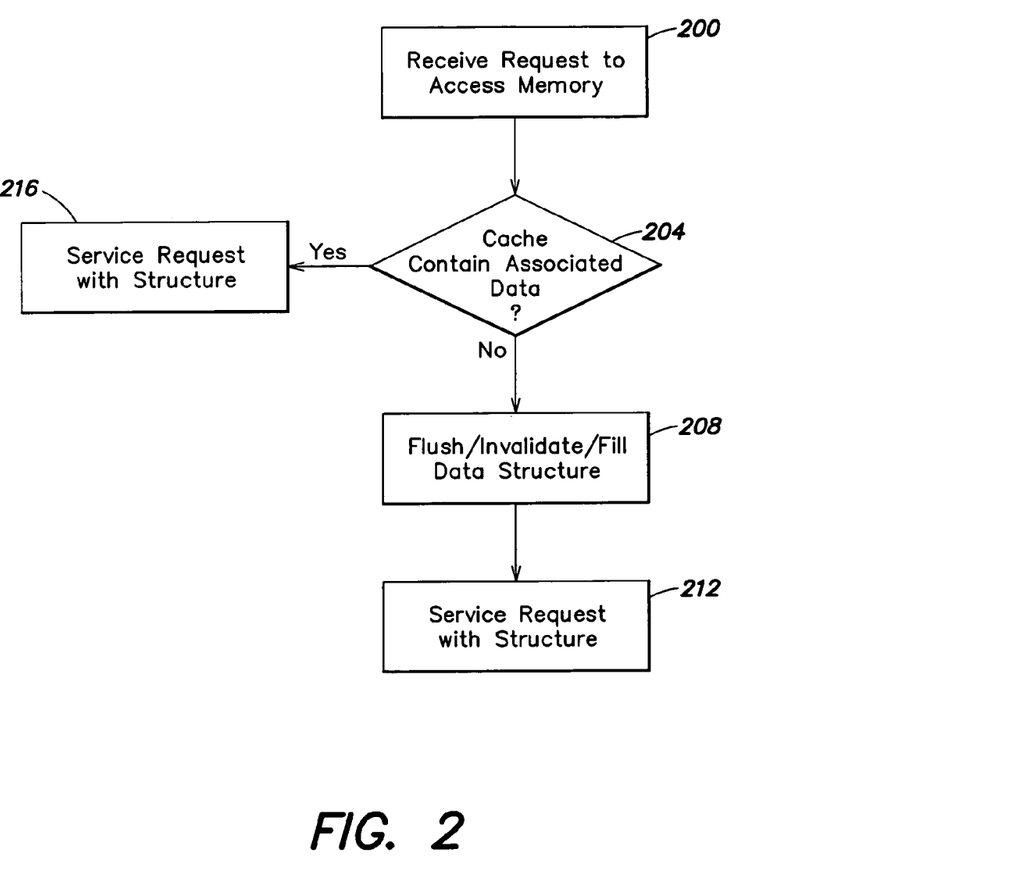
FIG. 2 presents a flowchart describing typical cache operation.

Referring to FIG. 2, in normal operation, a cache engine receives a request to read or write to an address in the backing store memory (Step 200). The cache engine determines whether the data associated with the address of the request is stored in the cache memory (Step 204) by examining the lookup table 108 for the presence of a line structure 100 containing the desired data. If it is determined that the data associated with the address of the request is not available in the cache, then a descriptor structure 104 in the descriptor pool 112 is selected (typically, the descriptor structure 104 associated with the least recently used line structure). If the line structure 100 associated with the selected descriptor structure 104 is "DIRTY," its contents are flushed to the backing store, invalidated, and then filled with valid data from the appropriate range of addresses in the backing store (Step 208). Then, the request is serviced using the newly updated line structure 100 (Step 212). If the data is determined to be present in the cache, the request may be serviced using the appropriate line structure 100 in the cache (Step 216).

While this caching method improves performance, it suffers from several inefficiencies. First, in the embodiment of FIG. 1, a line structure 100 contains 128 sectors of data. Yet, if just one sector is dirtied, the entire line structure 100 is marked as "DIRTY" and all 128 sectors are written to the backing store on the next flush/invalidate cycle (Step 208) when, optimally, only the one dirtied sector should be written to the store. Second, during large data transfers, the fill of the line structure 100 that occurs after a miss on an attempted write (Step 208) is wasted, as the data read into the line structure 100 is simply overwritten without any examination.

Dirty Subregion Tracking

Figure 3:
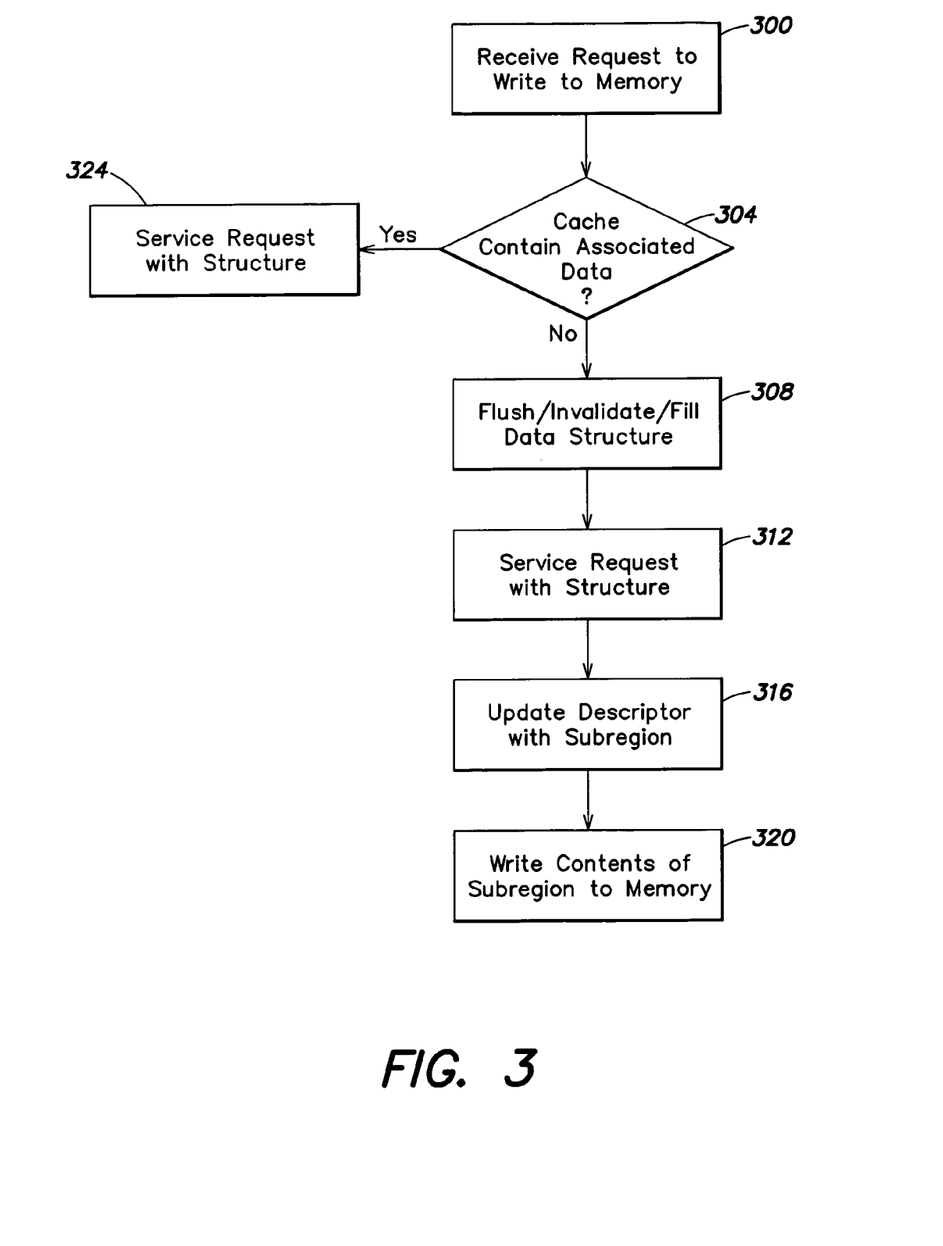
FIG. 3 presents a flowchart of an embodiment of a first method in accord with the present invention.

FIG. 3 presents a method for improved caching that addresses the first problem, i.e., where the size of individual read and write transactions is necessarily smaller than the size of the line structures 100 in the cache. In brief overview, by tracking the subregions of the line structures $100^N$ that are dirtied by write transactions, and only writing the dirtied subregions to the backing store on a flush or evict, the bandwidth required to write to the backing store may be reduced and cache performance improved.

In one embodiment, subregion tracking is implemented by modifying the descriptor structures $104^M$ to include a data field that tracks the "dirty" span of the associated line structure $100^N$. This dirty span field may be, for example, a pair of integers that specify the first sector and the last sector of the subrange in the line structure 100 that have been "dirtied" by various write transactions. The intervening sectors are assumed to be dirty for caching purposes, although not every sector may have been dirtied by a write transaction. For example, a write request that dirties sector 5 and a second write request that dirties sector 8 would result in a dirty span field indicating that sectors 5 through 8 are dirty, even though sectors 6 and 7 have not been affected by write transactions. Alternately, the data field tracking the dirty span may be a pair of integers that specify the first sector of the subrange and its length.

As discussed above, in normal operation, a cache engine receives a request to read or write to an address in the backing store memory (Step 300). The cache engine determines whether the data associated with the address of the request is stored in the cache memory (Step 304). If it is determined that the data associated with the address of the request is not available in the cache, then a descriptor structure 104 in the descriptor pool 112 is selected according to the eviction policy (e.g., the descriptor structure 104 associated with the least recently used line structure). If the line structure 100 associated with the selected descriptor structure 104 is "DIRTY," its contents are flushed to the backing store, invalidated, and then filled with valid data from the appropriate range of addresses in the backing store (Step 308). In contrast to the method of FIG. 2, if the dirty span field is set, then the only sectors flushed to the backing store from the line structure 100 are those specified by the dirty span field. The write request is serviced using the newly updated line structure 100 (Step 312) and the dirty span field of the associated descriptor structure 104 is set to indicate which blocks of the line structure 100 have been affected by servicing the write request (Step 316). With the dirty span field set, subsequent flush operations are made more efficient by writing only those blocks from the dirty span to the backing store (Step 320). If the data from the addresses of the write transaction is already present in the cache, then the write request may be serviced using the appropriate line structure 100 (Step 324).

Figure 4:
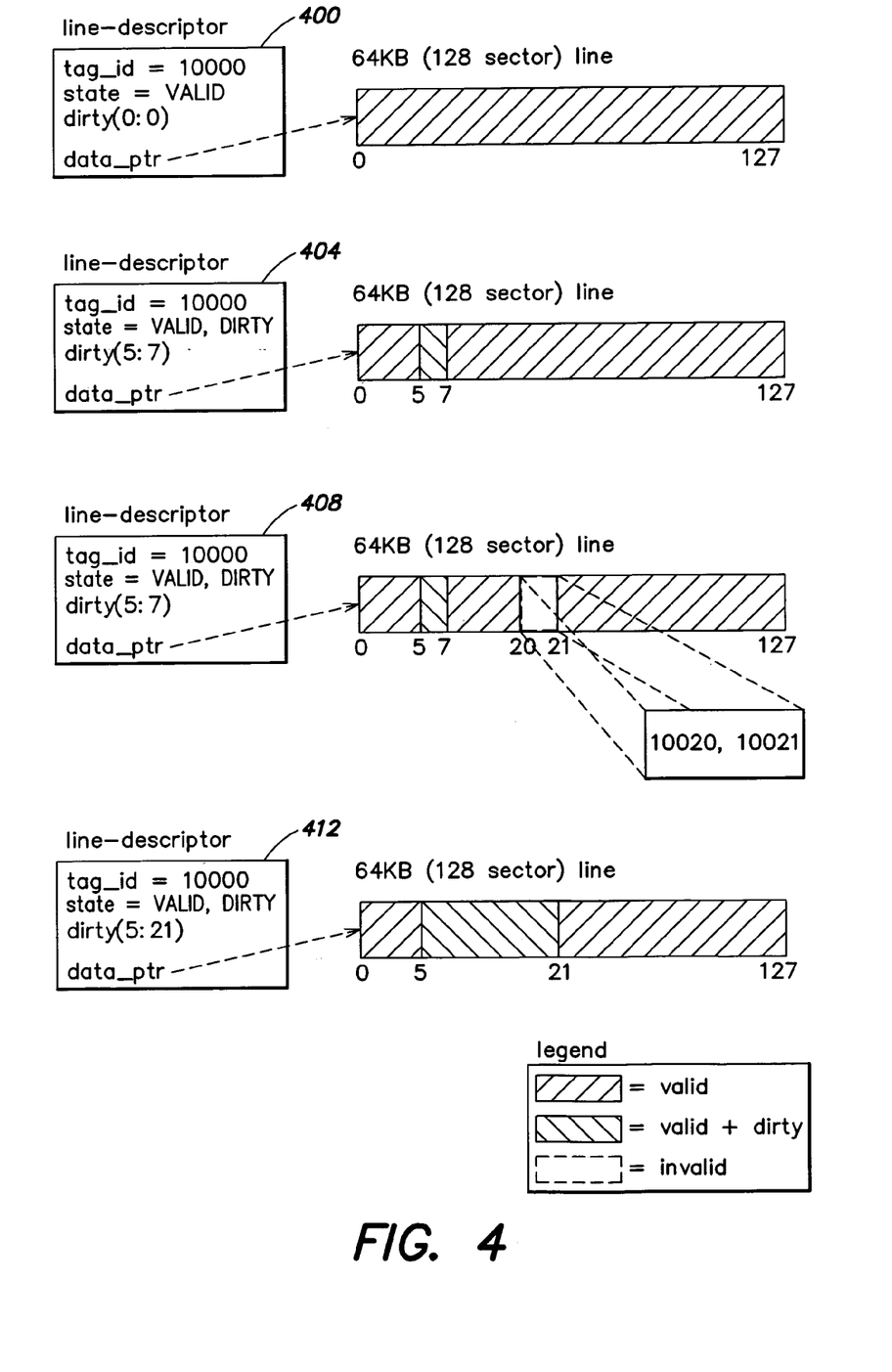
FIG. 4 presents an example of a cache write operation processed using the method of FIG. 3.

FIG. 4 presents an example of dirty region tracking using the method of FIG. 3 applied to the cache structure of FIG. 1. The cache engine receives a request to write to three sectors beginning at memory address 10005 in the backing store. The lookup table is examined to determine if a line structure 100 containing the data associated with address 10005 is present in the cache. From examination of the lookup table, it is determined that there is no line structure 100 in the cache associated with backing store address 10005. The cache engine selects a line structure 100—e.g., the least recently used structure—flushes it to the backing store if it is "DIRTY," invalidates its contents, and then fills it with data from the backing store from sectors 10000–10127. In the associated descriptor structure 104, the line is marked "VALID" using a state flag, the descriptor tag is set to 10000 (the base address of the data contained in the line structure 100), the pointer is directed to the line structure 100, and the dirty span field is set to "0:0," indicating that there is no dirty subregion in the line structure 100. The line structure 100 and associated descriptor structure 104 are illustrated at 400.

After the line structure 100 is created in the cache, the cache engine writes the data from the write request into the line structure at offsets 5, 6, and 7. The descriptor structure 104 is updated to reflect that the line is now "DIRTY" and the dirty span field is set to "5:7," indicating that the data at offsets 5 through 7 is to be written to the backing store on subsequent flush transactions. The updated line structure 100 and associated descriptor structure 104 are illustrated at 404.

The caching engine receives a new request to write to two sectors beginning at address 10020 in the backing store. First, examining the lookup table 108, the engine identifies the previously-created line structure 100 as containing data associated with address 10020. It services the request by writing its data to the line structure at offset locations 20 and 21, as illustrated at 408.

The dirty span field in the associated descriptor structure 104 is updated to indicate that the dirty span goes from offsets 5 through 21, as illustrated at 412. Although the dirty range indicates blocks 5 through 21 have been dirtied, in actuality only blocks 5, 6, 7, 20 and 21 have been dirtied. Therefore, on a subsequent flush, blocks 8–19 will also be written to the backing store when, strictly speaking, only blocks 5, 6, 7, 20, and 21 need to written to the store. Although this result appears suboptimal, operations involving a backing store typically utilize a hard disk or disk array having a large seek penalty but enjoying fairly high bandwidth. Therefore, it is advantageous to minimize the number of writes in favor of bulk write operations.

In another embodiment of the invention, for example, utilizing low-latency, low bandwidth backing stores, multiple dirty ranges in a single line structure 100 may be tracked using multiple dirty span fields. This approach adds overhead to the algorithm and requires additional memory for each descriptor structure 104. A similar result may be achieved by configuring the cache to utilize smaller line structures 100. Also, if the caching system consistently marks a large number of valid blocks "dirty" due to the coarseness of single dirty span tracking, then the size of the line structure 100 may require adjustment.

Lazy Cache Coherency

Figure 5:
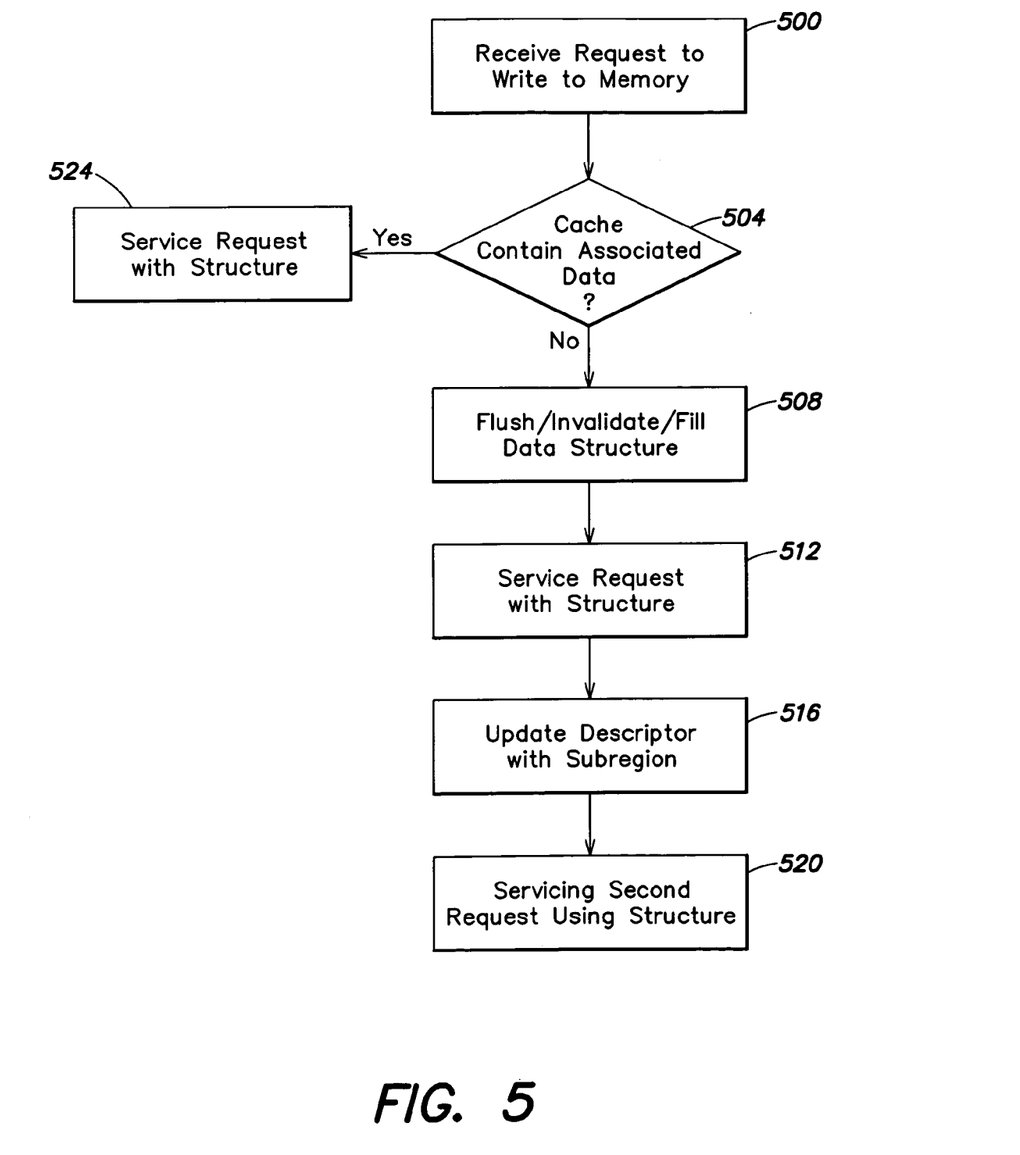
FIG. 5 presents a flowchart of an embodiment of a second method in accord with the present invention.

FIG. 5 presents a method whereby the second problem—wasted bandwidth from unnecessary fill operations on large data writes—is reduced. The problem arises from typical cache design assumptions. If the examination of a lookup table 108 indicates the cache contains a line structure 100 having data associated with the target addresses in the backing store, then it is assumed that the contents of the line structure 100 are coherent with the data stored at the backing store target addresses coupled with any locally dirty data. Therefore—as discussed above—when no associated structure 100 is present in the cache, the cache engine locates a candidate line structure 100 for eviction using the eviction policy (e.g. LRU), flushes the line structure's contents to the backing store if the line 100 is "DIRTY," fills the line structure 100 with data from the target addresses in the backing store, and then utilizes the newly-filled structure 100 to service future read and write requests.

Although this results in correct cache operation, it wastes the bandwidth associated with the fill operation under certain circumstances. For example, the writing of a large file to the backing store will overwrite and destroy the contents of the sectors at the target addresses in store without ever examining them. Under the previously-described cache system, each miss in the lookup table results in the flushing, invalidating, and filling of a line structure 100 in the cache memory which is subsequently overwritten with new data for later flushing to the store. In this case, the fill operation was unnecessary.

In accord with the present invention, unnecessary fill operations are identified and eliminated during the processing of a write transaction. In one implementation, the descriptor structures 104 associated with the line structures 100 are modified to include a new valid span field that tracks the valid sectors in the line structure and a new state flag ("COHERENT") that indicates coherence between the contents of the line structure 100 and the data stored at the corresponding addresses in the backing store.

In a traditional cache, the "VALID" flag indicates that a line structure $100^N$ is "VALID", "COHERENT", and has a valid span spanning all of the sectors in the line structure $100^N$. In this implementation with a "COHERENT" flag, a set "VALID" flag only indicates that the tag identifier and valid span fields are valid. To determine the validity of any data contained in the line structure $100^N$, the cache engine consults the "COHERENT" flag and/or the valid span field. A line that is "COHERENT" is the equivalent of a line structure 100 having a valid span that includes all of its sectors and having its "VALID" flag set. The presence of the "COHERENT" flag improves performance by replacing tests of the "VALID" flag and the valid span field with a single test of the "COHERENT" flag.

The cache engine sets the "COHERENT" flag in three circumstances. First, if a read request results in a miss, the system will flush-invalidate-fill a line structure 100 selected by the eviction policy, and set the "COHERENT" flag to indicate that the data contained in the line structure 100 is identical to the data contained at the corresponding addresses in the backing store. Second, if a request results in a "lazy miss"—discussed below—the line is marked "COHERENT" after the processing of the lazy miss. Third, if the line structure 100 becomes entirely "dirtied" (i.e., a dirty span from offsets 0 to (n−1), where n is the length of the line) as a result of one or more writes, then the "COHERENT" flag is set.

As discussed above, in normal operation, a cache engine receives a request to write to an address in the backing store memory (Step 500). The cache engine determines whether the data associated with the address of the request is stored in the cache memory (Step 504). If it is determined that the data associated with the address of the request is not available in the cache, then a descriptor structure 104 in the descriptor pool 112 is selected by the eviction policy (e.g., the descriptor structure 104 associated with the least recently used line structure). If the line structure 100 associated with the selected descriptor structure 104 is "DIRTY," its contents are flushed to the backing store and invalidated (Step 508). The write request is serviced using the newly updated line structure 100 (Step 512) and the dirty span field of the associated descriptor structure 104 is set to indicate which blocks of the line structure 100 have been affected by servicing the write request (Step 516). The updated line structure 100 and descriptor structure 104 are now used to service subsequent requests (Step 520). If the data from the addresses of the write transaction is already present in the cache, then the write request may be serviced using the appropriate line structure 100 (Step 524). In contrast to the method of FIG. 2, the line structure 100 is not filled with data from the backing store when the received transaction is a write transaction. The line structure 100 is only filled with data from the backing store when the transaction is a read transaction.

More specifically, when the transaction is a read transaction to an address that is not cached, a line structure 100 is located by the eviction policy, flushed, invalidated, and filled as described above. The associated descriptor structure 104 is set to indicate that this line structure 100 is "VALID" and "COHERENT," and its valid span field is set to encompass all of the sectors in the line structure 100. When the transaction is a write transaction to an address that is not cached, the line structure 100 is located, flushed and invalidated, but is not filled from the backing store. The associated descriptor structure 104 is set to indicate that the line structure 100 is "VALID," but the "COHERENT" flag is not set. The valid span field is initially set to "0:0" indicating that no sector in the line structure 100 is currently valid.

Figure 6A:
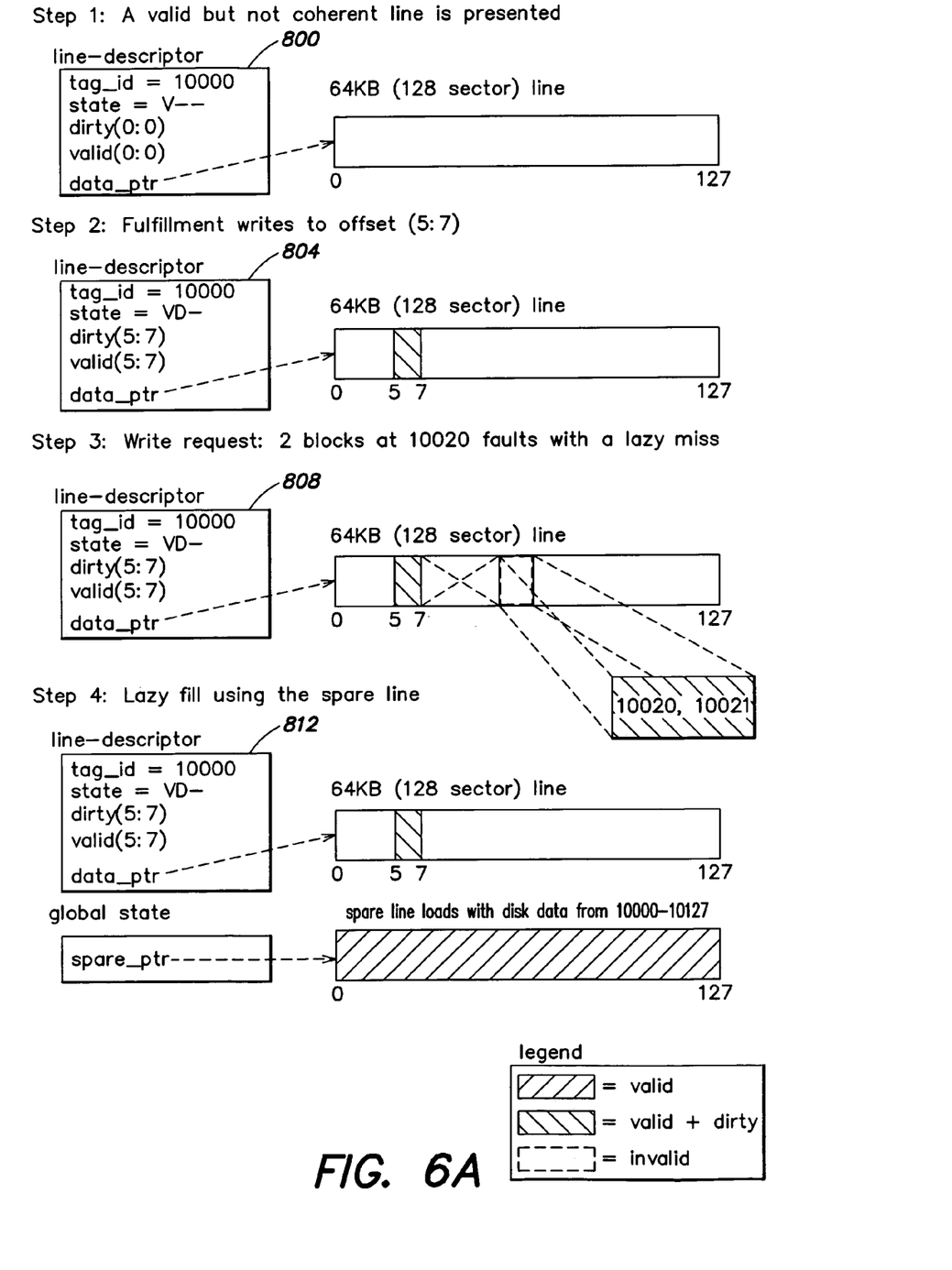
FIGS. 6A and 6B present an example of multiple cache write operations processed using the method of FIG. 5.
Figure 6B:
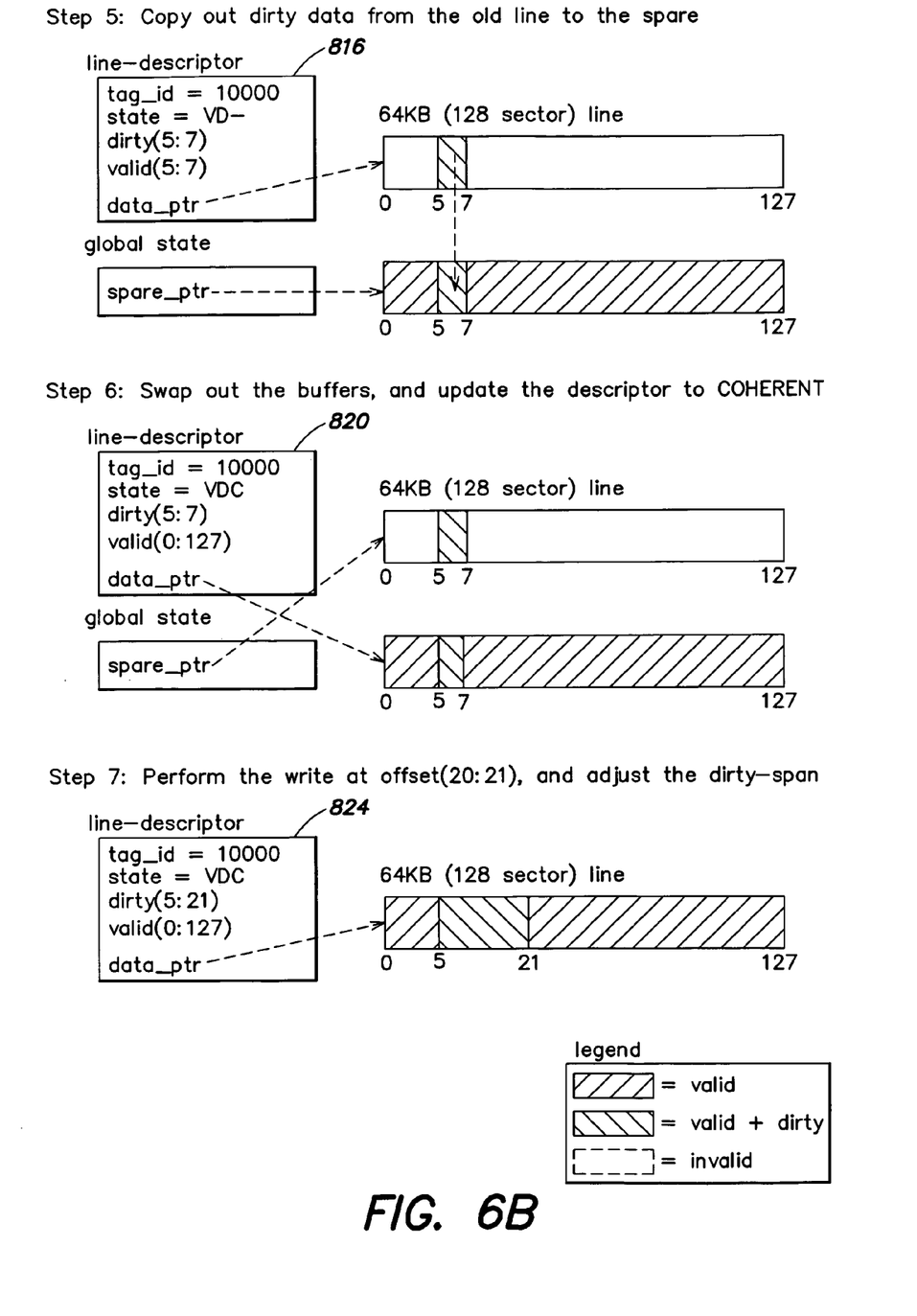

The example from FIG. 4 is adapted to illustrate the lazy cache coherence technique in FIGS. 6A and 6B. The cache engine receives a request to write to three sectors at memory address 10005 in the backing store. The lookup table is examined to determine if a line structure 100 containing the data associated with address 10005 is present in the cache. From examination of the lookup table, it is determined that there is no line structure 100 in the cache associated with backing store address 10005.

Previously, a candidate line structure 100 (selected by the eviction policy) would have been flushed, invalidated and filled with data from the appropriate addresses in the backing store. Under the lazy cache coherency strategy, the candidate line structure is flushed and invalidated, but it is not filled, as illustrated at 800.

The write transaction is processed using the located line structure 100, storing the data from the transaction at offsets 5 through 7. In the associated descriptor structure 104, the descriptor tag is set to 10000 (the base address of the line structure 100) and the pointer is directed to the line structure 100. The state flags are set to indicate that the line structure 100 is "VALID" and "DIRTY" (but not "COHERENT") and the valid span fields and dirty span fields are set to "5:7" indicating that offsets 5 through 7 in the line structure 100 contain valid data and have been dirtied through write transactions. The resulting line structure 100 is illustrated at 804.

The fulfillment engine can process subsequent transactions directed to address 10005 in the backing store using the line structure 100 and the associated descriptor structure 104 with the valid span field and the dirty span fields. The addresses in a read request can be compared against the range specified in the valid span field to determine if the requested data is actually contained in the line structure 100. If the addresses specified in the read request are not wholly contained within the valid span—e.g., the request is for offsets 4 through 7—then the cache engine needs to perform a "lazy fill" operation on the line structure 100, as described below. Similarly, if the address range specified in a subsequent write request is wholly outside the valid range of the line structure 100—e.g., the request is for offsets 20 and 21, as illustrated at 808—then the cache engine also needs to perform a lazy fill on the line structure 100.

A "lazy fill" operation is, effectively, a properly executed deferred fill operation. Because the fill has been deferred, it is necessary to consolidate the information with the backing store with the information that has already been written to the line structure 100. This consolidation may be achieved, for example, using a spare line structure 100'. As illustrated at 812, the "lazy fill" loads information into the spare line structure 100' from the backing memory. As illustrated at 816, the data of the original line structure 100 is copied onto the spare line structure 100'. As illustrated at 820, the descriptor structure 104 associated with the original line structure 100 is adjusted to point to the spare line structure 100', the state flags are set to indicate that the spare line structure 100' is "COHERENT" and the valid range is set to span the entire line structure 100'. The spare line structure 100' has replaced the primary line structure 100 associated with the descriptor structure 104. The original line structure 100 may now be used as a spare line structure 100' in the next lazy fill operation. As illustrated at 824, the fulfillment engine completes servicing the write request by updating the data at offsets 20 and 21 and changing the dirty span field to indicate that blocks 5 through 21 are dirty for subsequent flush operations.

In situations where a lazy miss occurs on a line structure 100 having dirtied data either at its start (from offsets 0 through n−1) or its end (from offsets n−1 through the end of the line structure), the use of the spare line structure 100' may be eliminated from the lazy fill operation and the line fill may be performed using the original line structure 100.

If a cache read request does not prompt a lazy fill operation, then the data sought by the read request may simply be copied from the valid range of the line structure 100 into a buffer and returned for further processing. Similarly, a cache write request that does not prompt a lazy fill operation may be serviced by copying the data of the request from the buffer to the line structure 100 and updating the valid span field and dirty span field as discussed above.

Many alterations and modifications may be made without departing from the spirit and scope of the invention. For example, as the methods relating to lazy cache coherency utilize the same structures as the methods relating to dirty subregion tracking, both techniques may be implemented simultaneously in the same caching subsystem. Therefore, it is to be understood that these embodiments have been shown by way of example and should not be taken as limiting the invention, which is defined by the following claims. These claims are thus to be read as not only including literally what is set forth by the claims but also to include those equivalents which are substantially different, even though not identical in other respects to what is shown and described in the above illustrations.

What is claimed is:

1. A method for servicing requests to a backing store using a cache comprising at least one structure, the cache structure being associated with at least one address in the backing store, the method comprising:
   (a) receiving a request to write to at least one address in the backing store;
   (b) determining the presence in the cache of a cache structure associated with the at least one address;
   (c) if no cache structure is associated with the at least one address, adding data to an invalidated cache structure from at least one address in the backing store that includes the at least one address of the request;
   (d) servicing the request using the cache structure of step (c); and
   (e) storing a value indicating a contiguous subregion of the structure affected by the servicing of the request.

2. The method of claim 1 wherein the cache structures are multi-byte lines.

3. The method of claim 1 wherein the value is stored in a descriptor comprising a pointer to the cache structure and at least one field for storing a value.

4. The method of claim 1 wherein the cache structure of step (c) is the least recently used structure in the cache.

5. The method of claim 1 wherein step (b) comprises:
   (b-1) computing an index value from the at least one address of the request; and
   (b-2) examining an entry in a lookup table associated with the computed index value to determine the presence in the cache of a cache structure associated wit the at least one address.

6. The method of claim 1 wherein the contents of the cache structure of step (c) are written to the backing store before the addition of the data from the backing store.

7. The method of claim 6 wherein the written contents of the cache structure are a subset of the contents of the cache structure.

8. The method of claim 1 wherein step (e) comprises:
   (e-1) accessing a previously stored subregion value;
   (e-2) computing a flew subregion value reflecting the sum of the previously stored subregion value and the value specifying the subregion affected by the servicing of the request, the resulting sum specifying a contiguous range; and
   (e-3) storing the computed subregion value.

9. The method of claim 1 further comprising writing the contents of the contiguous subregion of the cache structure to the backing store.

10. The method of claim 1 wherein the size of the cache structures is adjusted to improve write performance.

11. A method for servicing requests to a backing store using a cache comprising at least one structure, the cache structure being associated with at least one address in the backing store, the method comprising:
   (a) receiving a request to write to at least one address in the backing store;
   (b) determining the presence in the cache of a cache structure associated with the at least one address;
   (c) if no cache structure is associated with the at least one address, evicting a first structure in the cache;
   (d) servicing the request using the first cache structure; and
   (e) storing a value indicating a contiguous subregion of the first cache structure affected by the servicing of the request.

12. The method of claim 11 further comprising servicing a second request to read from at least one address in the backing store, wherein the at least one address of the second request is: (i) associated with the first cache structure, and (ii) contained in the addresses associated with the contiguous subregion of the first cache structure.

13. The method of claim 11 further comprising:
   receiving a second request to read from at least one address in the backing store, wherein the at least one address of the second request is: (i) associated with the first cache structure, and (ii) not contained in the addresses associated with the contiguous subregion of the first cache structure;
   adding data to a second cache structure from at least one address in the backing store that includes the at least one address of the second request; and
   copying the data from a contiguous subregion of the first cache structure to the second cache structure.

14. The method of claim 13 further comprising servicing the second request using the second cache structure.

15. The method of claim 13 further comprising replacing the first cache structure with the second cache structure.

16. The method of claim 15 further comprising modifying the stored subregion value to reflect the sum of the previously-stored subregion value for the first cache structure and the value specifying the subregion affected by the servicing of the second request, the resulting sum specifying a contiguous range.

17. The method of claim 11 further comprising:
   receiving a second request to write to at least one address in the backing store, the at least one address of the second request is: (i) associated wit the first cache structure, and (ii) not contained in the addresses associated with the contiguous subregion of the first cache structure;
   adding data to a second structure in the cache from at least one addresses in the backing store that includes the at least one address of the second request; and
   copying the data from the contiguous subregion of the first cache structure to the second cache structure.

18. The method of claim 17 further comprising servicing the second request using the second cache structure.

19. The method of claim 17 further comprising replacing the first cache structure with the second cache structure.

20. The method of claim 19 further comprising modifying the stored subregion value to reflect the sum of the previously-stored subregion value for the first cache structure with the value specifying the subregion affected by the servicing of the second request, the resulting sum specifying a contiguous range.

21. The method of claim 11 wherein the cache structures are multi-byte lines.

22. The method of claim 11 wherein the value is stored in a descriptor comprising a pointer to the cache stricture and at least one field for storing a value.

23. The method of claim 11 wherein the structure of step (c) is the least recently used structure in the cache.

24. The method of claim 11 wherein step (b) comprises:
(b-1) computing an index value from the at least one address of the request; and
(b-2) examining an entry in a lookup table associated with the computed index value to determine the presence in the cache of a cache structure associated wit the at least one address.

25. The method of claim 11 wherein the contents of the cache structure of step (c) are written to a backing store before the first structure is invalidated.

26. The method of claim 25 wherein the written contents of the cache structure are a subset of the contents of the cache structure.

27. The method of claim 11 further comprising writing the contents of the contiguous subregion of the cache structure to the backing store.

28. The method of claim 11 wherein the size of the cache structures is adjusted to improve write performance.

* * * * *